(12) United States Patent
Boaz et al.

(10) Patent No.: US 12,029,151 B2
(45) Date of Patent: Jul. 9, 2024

(54) PLANTER QUALITY MANAGER

(71) Applicant: DEERE & COMPANY, Moline, IL (US)

(72) Inventors: Robert D. Boaz, Grimes, IA (US);
Kyle A. Shipley, Nodaway, IA (US);
Greg T. Buse, Johnston, IA (US);
Kurtis Krumm, Johnston, IA (US);
Erich Wassilak, Des Moines, IA (US);
Tyler J. Van Steenhuyse, Urbandale, IA (US); Benjamin R. Dow, Urbandale, IA (US); Kevin Hixon, Pateros, WA (US)

(73) Assignee: DEERE & COMPANY, Moline, IL (US)

(*) Notice: Subject to any disclaimer, the term of this patent is extended or adjusted under 35 U.S.C. 154(b) by 182 days.

(21) Appl. No.: 17/515,005

(22) Filed: Oct. 29, 2021

(65) Prior Publication Data
US 2022/0295689 A1   Sep. 22, 2022

Related U.S. Application Data

(60) Provisional application No. 63/200,649, filed on Mar. 19, 2021.

(51) Int. Cl.
*A01C 7/10* (2006.01)
*A01B 79/00* (2006.01)
*G06F 16/22* (2019.01)
*G06F 16/23* (2019.01)

(52) U.S. Cl.
CPC ............ *A01C 7/105* (2013.01); *A01B 79/005* (2013.01); *A01C 7/107* (2013.01); *G06F 16/2282* (2019.01); *G06F 16/23* (2019.01)

(58) Field of Classification Search
CPC ....... A01C 7/105; A01C 7/107; A01B 79/005; G06F 16/2282; G06F 16/23
See application file for complete search history.

(56) References Cited

U.S. PATENT DOCUMENTS

| 4,159,064 A * | 6/1979 | Hood ..................... H03K 21/18 |
| | | 111/180 |
| 5,635,911 A * | 6/1997 | Landers ................. A01C 7/105 |
| | | 250/222.2 |
| 6,093,926 A * | 7/2000 | Mertins .................... G01V 8/12 |
| | | 377/6 |
| 2022/0197256 A1 * | 6/2022 | Frank ........................ G01F 1/74 |
| 2022/0295689 A1 | 9/2022 | Boaz et al. |

* cited by examiner

*Primary Examiner* — Hongmin Fan
(74) *Attorney, Agent, or Firm* — Michael Best & Friedrich LLP (57) ABSTRACT

Systems and methods for monitoring seed placement by a planting machine with a plurality of row units. An average seed placement metric is calculated for each individual row unit based on a data stream of sensor data corresponding to a defined calculation window. Each calculated metric is compared to a defined performance threshold and an error alert signal is transmitted based on the comparison. The calculation window can be adjusted by a user and the average seed placement metrics and the error alert signal are updated based on the adjusted calculation window. A graphical user interface also displays the calculated metrics for each individual row unit in a row data table and updates the row data table in response to receiving the user selection of the new calculation window.

20 Claims, 7 Drawing Sheets

PLANTER QUALITY MANAGER

RELATED APPLICATIONS

This application claims the priority benefit of U.S. Provisional Patent Application No. 63/200,649, filed Mar. 19, 2021, entitled "PLANTER QUALITY MANAGER FOR MOBILE APPLICATION," the entire contents of which are incorporated herein by reference.

BACKGROUND

The present invention relates to systems and methods for managing planting quality of a seed placed by a seed planting machine—for example, a crop row planter configured to plant seeds in a row along a field surface. More specifically, the present invention relates to system and methods for monitoring and evaluating the performance of machines that plant seeds.

SUMMARY

In one embodiment, the invention provides a seed placement monitoring system including an electronic controller. The controller is configured to receive a data stream from one or more sensors of a seed planting machine, wherein the data stream is indicative of seed placement in a field by each of a plurality of row units of the seed planting machine. The controller calculates an average seed placement metric for a defined calculation window for each of the plurality of row units, compares each metric to a defined performance threshold, and transmits an error alert signal in response to the comparison. The controller also receives an adjusted calculation window through the user interface, recalculates the average seed placement metrics based on the adjusted calculation window, and updates the error alert signal based on the updated calculations. In some implementations, a graphical user interface displays the calculated metrics for each individual row unit in a row data table and updates the row data table in response to receiving the user selection of a new calculation window.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Various embodiments of the present invention disclose a system that allows users to set custom alerts for the singulation and gauge wheel margin attributes and provides a tabular display of values affecting seed spacing (e.g., singulation) and seed depth (e.g., gauge wheel margin) over a user selectable planting distance for each reporting row unit on a planting machine. In some implementations, the system identifies row numbers corresponding to row units of the planting machine that are under performing in the field, allowing a user to apply corrective measures to the row unit on that row to bring performance back in line with the rest of the row units of the planting machine to lessen the impact to yield.

Embodiments of the present invention recognize that challenges exist with the user identifying a specific row unit that is under performing while in the process of operating the seed planting machine in the field. For example, the user would have to inspect a singulation or gauge wheel margin attribute map and compare the plotted attribute map colors to a legend of breakpoint values to identify under performance. Additionally, manual map inspection may happen several passes after the issue first presented itself or maybe even after the entire field is planted, which increases the impact to yield. Various embodiments of the present invention provide a mechanism to trigger alerts that a user receives that indicates a potential issue as soon as the issue presents itself based on the custom distance and alert range bounds for Singulation and/or gauge wheel margin. The alert may be displayed on a display of a user device regardless of what attribute map is currently visible to the user. The mechanism indicates problems with specific row units so the user can remedy earlier in the planting process, which improves the quality of the planted field, management of planting equipment, and performance of the planting machine.

Additionally, embodiments of the present invention provide attribute data tables (e.g., a "row data table") to the user with the attribute values for each row unit of the planting machine, which provides additional context to the user related to performance when comparing one row unit of the seed planting machine to another. For instance, blockage monitors of the planting machine inform the user of row units that are not planting any seeds due to a complete blockage. The embodiments of the present invention detect more subtle performance issues, such as a single disc opening being plugged on the seed disc as indicated by every 10th seed being skipped, which is the type of subtle issue that the blockage monitor or embedded vehicle display fails to detect. Also, embodiments of the present invention provide tailored alerts to the user by configuring the alerts based on distances and attribute thresholds to inform the user of performance issues near real-time.

Figure 1:
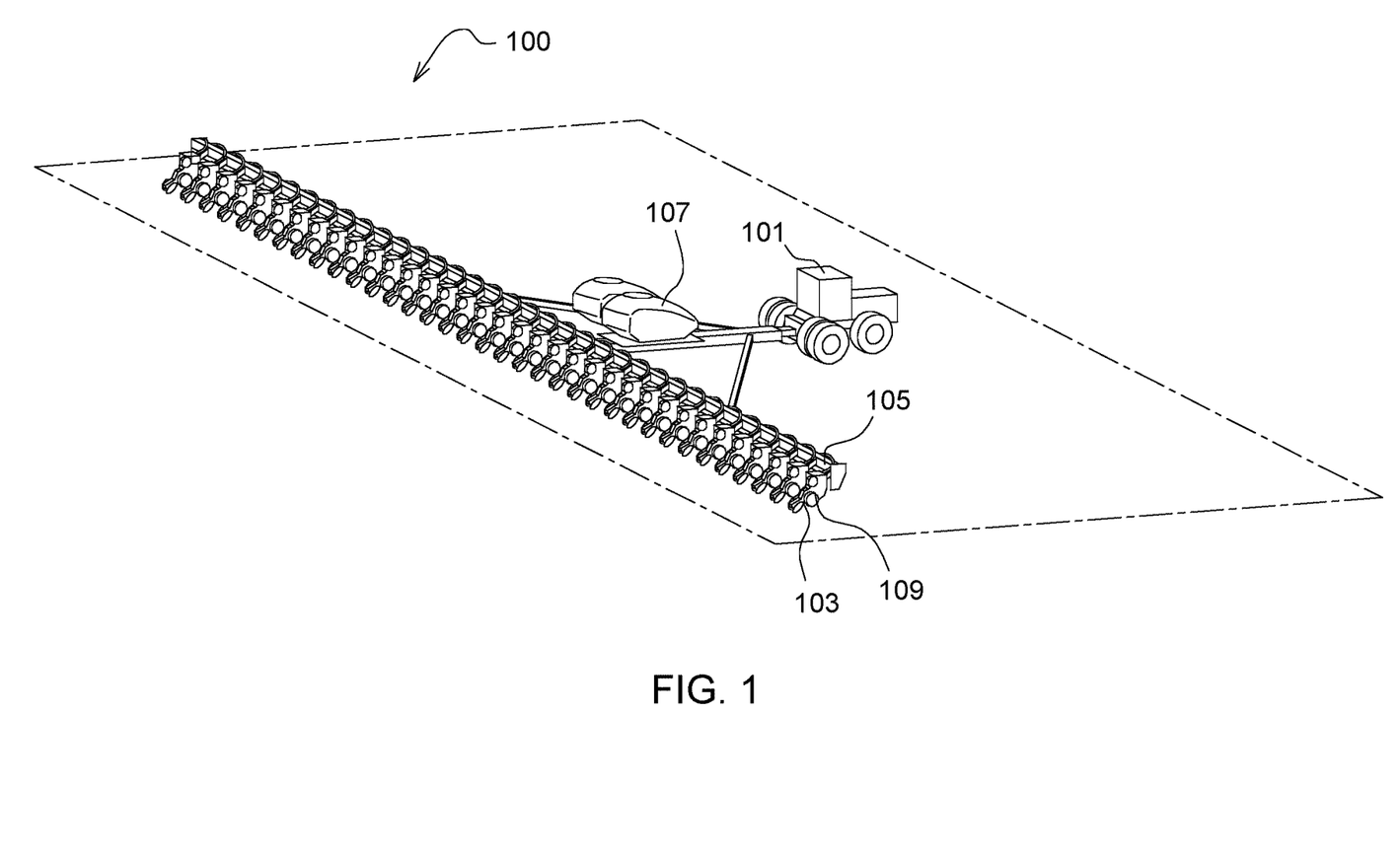
FIG. 1 is a perspective view of a row crop planter according to one embodiment.

FIG. 1 illustrates an example of a row crop planter 100 that is pulled by a tractor 101 during operation. The row crop planter 100 includes a plurality of row seeders 103 and gauge wheels 109 arranged in parallel along a support bar 105, and one or more seed storage vessels 107. Although the example of FIG. 1 shows a pair of seed storage vessels 107, in other implementations, the row crop planter 100 may include more or fewer seed storage vessels 107. For example, in some implementations, each row seeder 103 may include a separate seed storage vessel 107. As the row crop planter 100 is pulled across a field surface, each row seeder 103 opens a trench (or furrow) with a defined depth, deposits a seed from the seed storage vessel 107 into the trench, and, in some cases, closes the trench. As a result, the operation of the row crop planter 100 produces a series of generally parallel trenches that are each seeded with multiple seeds along the length of the trench.

Figure 2:
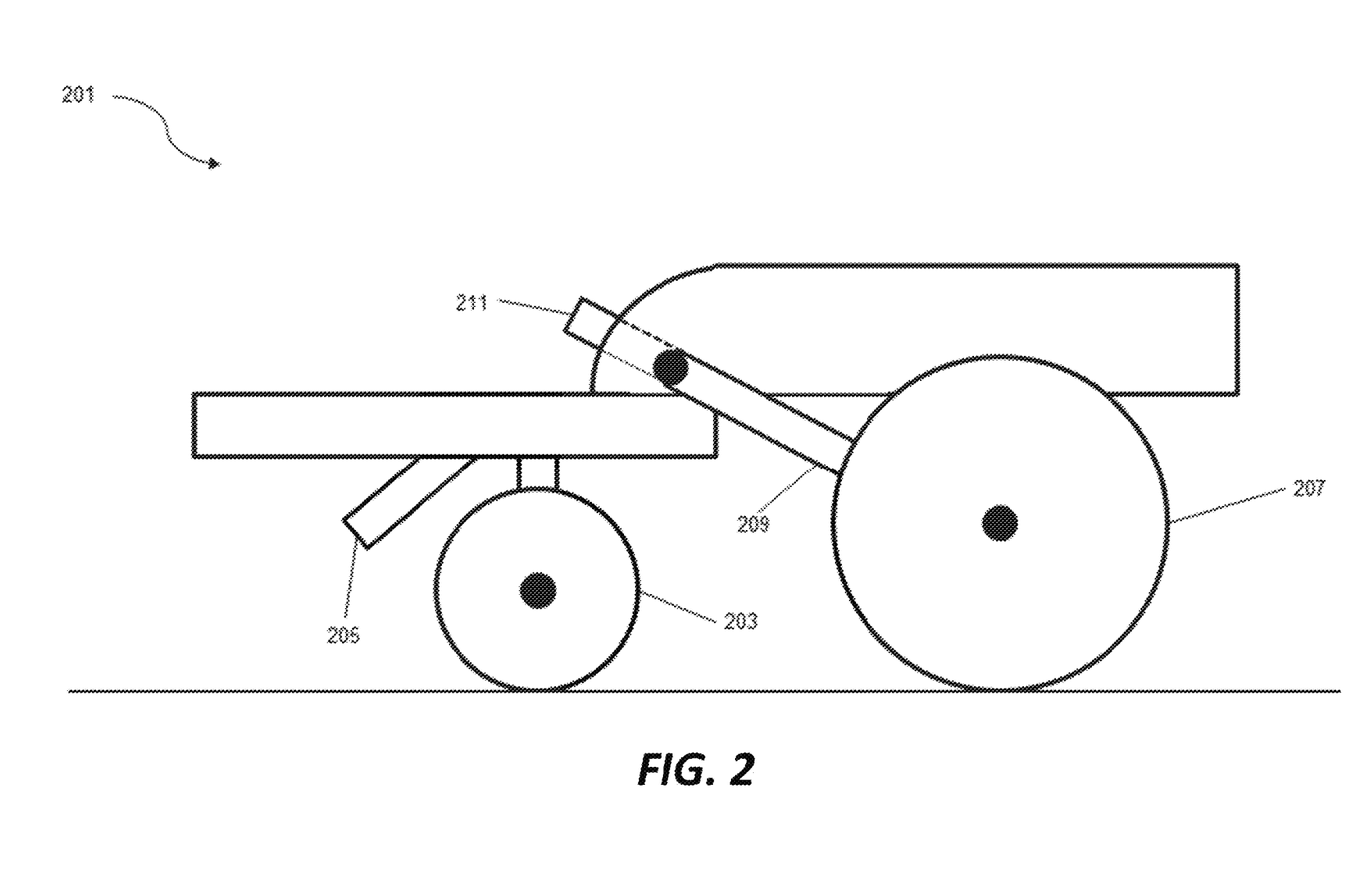
FIG. 2 is a schematic diagram of an example of a row seeder with an opening disc and gauge wheel for use in the row crop planter of FIG. 1.

FIG. 2 illustrates one example of a row seeder 201 that might be used as a row seeder 103 of the row crop planter 100 of FIG. 1. The row seeder 201 includes one or more "opening discs" 203 configured to open/dig a trench at a defined depth as the row seeder 201 is pulled along the field surface. A seed tube 205 is positioned and configured to deposit seeds from the seed storage vessel 107 into the trench after the trench is opened by the opening disc 203. In some implementations, the row seeder 201 is configured to dispense individual seeds through the seed tube 205, one-at-a time, at locations along the trench. In some implementations, the row seeder 201 is further equipped with a seed sensor (e.g., incorporated into the seed tube 205). The seed sensor may be configured to detect when an individual seed passes through the seed tube 205 or, in some implementations, to when multiple seeds move through the seed tube 205.

For example, the seed sensor may include a light beam emitter and a light sensor positioned in a counter-facing arrangement on either side of the seed tube 205 so that, when no seed is present in the seed tube, a light beam emitted by the light beam emitter is received & detected by the light sensor. When a seed passes through the seed tube, the light beam is obstructed and, in response to the temporary absence of a light beam detected by the light sensor, the seed sensor generates a signal indicating that a seed has passed through the seed tube 205. Although the example of FIG. 2 includes a seed tube 205 and a seed sensor configured to detect a seed in the seed tube, in some other implementations, the seed planting machine 100 and/or the individual row seeder 201 does not include a "seed tube" and may instead include another type of "trench delivery system" (e.g., a brush belt) configured to deliver the seed from the planter into the trench. In some implementations that do not utilize a "seed tube," the seed sensor may be configured to detect the presence of a seed moving through another part of the seed planting machine (e.g., through the trench delivery system) that is about to be dispensed by the seed planting machine 100.

In some implementations, the data of the seed sensor can be utilized to determine seed singulation performance of the row seeder 201. Singulation is a measurement of how well a meter is dropping one seed at a time into a seed tube. For example, singulation is 100% when every seed is being metered one at a time. However, the singulation measurement decreases when a row seeder 201 deposits multiple seeds at the same time instead of depositing just one seed, when the row seeder 201 fails to deposit a seed at an intended seed location, or when the row seeder 201 deposits a seed at an unintended locations. Decreases in the singulation percentage results in yield lost. In some implementations, the data of the seed sensor can be utilized to identify performance issues associated with singulation of one or more of the row seeders 201. For example, if an issue such as every 10th seed is skipped arises in a particular row seeder 201 (i.e., issue appears as anomalies), a blockage monitor or embedded vehicle display may not detect this type of subtle issue. In this example, the data of the seed sensor is utilized to identify that the particular row seeder 201 is underperforming due to seed skipping (e.g., a single disc opening being plugged on the seed disc).

In the example of FIG. 2, the row seeder 201 also includes a depth adjuster 211 coupled to a gauge wheel 207, which is connected to the row seeder 201 via arm 209, configured to control the position of the gauge wheel 207 and as a result, the depth the trench the row seeder 201 opens. The gauge wheel 207 sets the depth the opening disc 203 is configured to open/dig a trench. Also, the gauge wheel 207 firm the soil against the opening disc 203 to create a defined seed trench/furrow. In some implementations, the depth adjuster 211 is further equipped with a force sensor (e.g., incorporated into the depth adjuster 211). The force sensor may be configured to measure a load (e.g., pressure, force, soil resistance, etc.) the ground engages to the gauge wheel 207. The force sensor generates a signal corresponding to the load of the gauge wheel 207. In some implementations that do not utilize the depth adjuster 211 the force sensor may be configured to measure a load (e.g., pressure, force, etc.) the ground engages to the gauge wheel 207 through another part of the row seeder 201 (e.g., the arm 209, opening disc of gauge (not shown), etc.).

In some implementations, the data of the force sensor can be utilized to determine gauge wheel margin performance of the row seeder 201. The gauge wheel margin is the amount of weight carried by a row unit depth gauging system (e.g., the row seeder 201) that is over and above what is required for openers to penetrate to full planting depth. For example, a down force on the row seeder 201 that is not ideal can result in compacted or collapsing side walls of a trench. Additionally, resulting in seeds not being placed at desired depth which can decrease yield.

Figure 3:
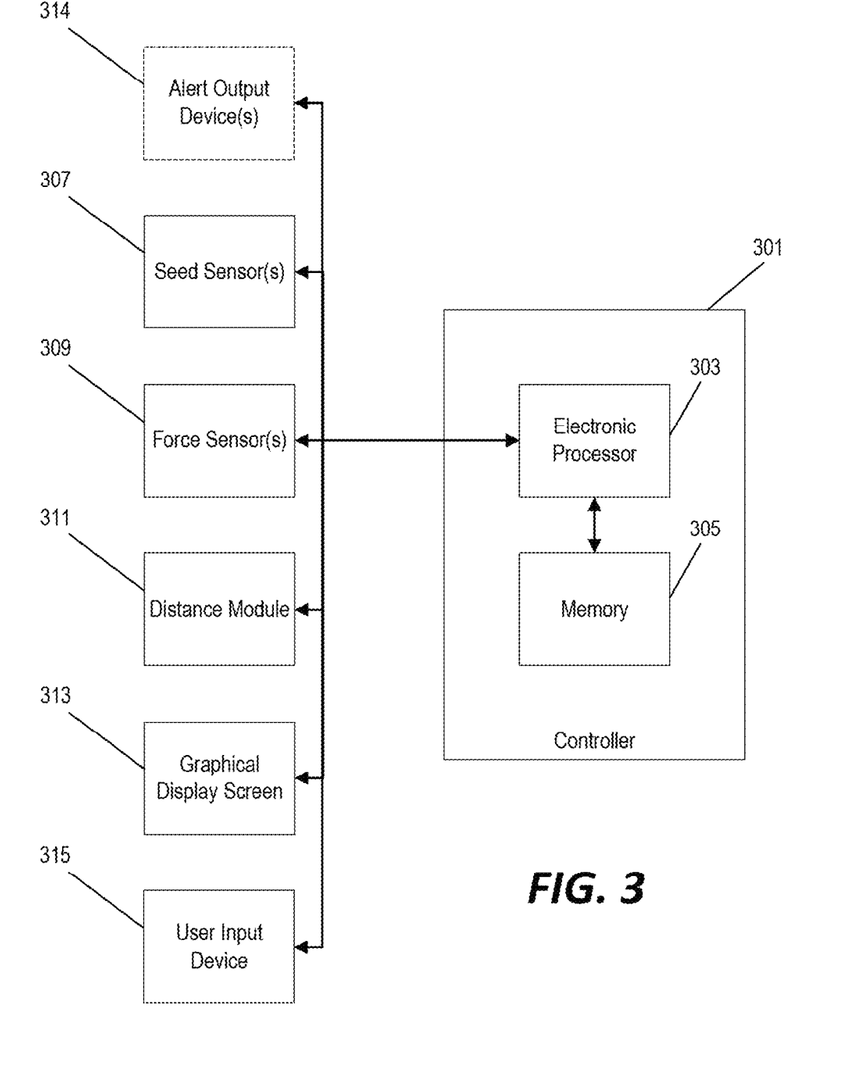
FIG. 3 is a block diagram of a control system for managing planting quality of a seed placed by the row crop planter of FIG. 1.

FIG. 3 illustrates an example of a system configured to managing and monitor planting quality of a seed placed by a seed planting machine (e.g., the crop row planter 100 of FIG. 1). A controller 301 includes an electronic processor 303 and a non-transitory, computer-readable memory 305. The memory 305 is communicatively coupled to the processor 303 and is configured to store data and instructions that, when executed by the processor 303, cause the controller 301 to perform functionality such as described herein. The controller 301 is also communicatively coupled to a seed sensor 307, a force sensor 309, a distance module 311, and a graphical display screen 313.

In the example of FIG. 3, the distance module 311 is a mechanism for determining the position and distance travelled by the seed planting machine. The distance module 311 may include maps, which may be displayed in human-readable format via text or in a graphical format. Also, the distance module 311 may include a tracker (e.g., global positioning system (GPS), dead reckoning system, etc.) to determine a location of the seed planting machine via sensors, maps, or information from external sources. In other implementations, the distance module 311 is configured to determine the distance travelled by the seed planting machine by determining a ground speed of the seed planting machine over a corresponding period of time. The distance module 311 provides a distance the seed planting machine travels during seed planting to the controller 301. In some implementations, the distance module 311 is directly coupled to the controller 301 while, in other implementations, the distance module 311 may be coupled to another intermediate controller (not pictured) that receives data from the distance module 311 and communicates to the controller 301.

As discussed above, the seed sensor 307 provides a signal to the controller 301 indicating when a seed passes through a seed tube. In some implementations, the seed sensor 307 is directly coupled to the controller 301 while, in other implementations, one or more seed sensors 307 might be coupled to another intermediate controller (not pictured) that receives data from the seed sensor 307 and communicates to the controller 301. In some implementations, the seed sensor 307 may include a light beam emitter/sensor that is configured to detect each time a seed passes through a seed tube of a row unit. In other implementations, the seed sensor 307 may include a camera positioned with a field of view including the field surface near the output of at least one row unit 103 and, in some such implementations, the controller 301 may be configured to analyze the image data captured by the camera to detect when a seed is dispense (e.g., when a seed appears in the image data) and how many seeds are dispensed (e.g., how many seeds appear in the image data).

The force sensor 309 provides a signal to the controller 301 indicating a load the ground engages to a gauge wheel of a planting machine. Too much force on a row unit generally results in the seeds being planted too deep and not enough force generally results in the seed being planted to shallow. In some implementations, the force sensor 309 is directly coupled to the controller 301 while, in other implementations, one or more force sensors 309 may be coupled to another intermediate controller (not pictured) that receives data from the force sensor 309 and communicates to the controller 301. Although in the examples described below, seed depth is monitored based at least in part on the downforce for the row unit determined based on the output of the force sensor(s) 309, in other implementations, other mechanisms may be used to determine seed depth. For example, in some implementations, a camera positioned with a field of view that includes the seeds as they are dispensed from the row unit and come to rest in the field and, in some such implementations, the controller is configured to analyze the captured image data to determine a seed depth based on the captured image data.

The controller 301 is configured to receive data captured by the seed sensor 307, force sensor 309, and/or the distance module 311 and trigger an error alert signal. In some implementations, the error alert signal is transmitted to the graphical display screen 313 and causes a visual alert indication to be displayed on the graphical display screen 313. In other implementations, the error alert signal is transmitted to one or more alert output devices 314 that are configured to generate a visual, auditory, and/or haptic alert output in response to receiving the error alert signal. The controller 301 is also configured to generate a graphical user interface and to cause the graphical user interface to be displayed on the graphical display screen 313. In some implementations, the controller 301 is also configured to receive user inputs from a user input device 315. In some implementations, the graphical display screen 313 and the user input device 315 are positioned in an operator cab of the planting machine (or the tractor 101 pulling the planting machine 100). In other implementations, the electronic controller 301 is configured to display the graphical user interface on a device that is remote to the planting machine such as, for example, a portable computing device such as a tablet computer or a smart phone. Accordingly, in some such implementations, the controller 301 may be included as a component of the remote device and be configured to receive a data stream of sensor data from the seed sensor 307, the depth sensors 309, and the distance module 311 via a wireless communication interface (e.g., a wi-fi, RF, or other wireless transceiver). In other implementations, the controller 301 is included as a component of the planting machine and is configured to communicate with the graphical display screen 313 and the user input device 315 through a wired or wireless communication interface. Lastly, in some implementations, the graphical display screen 313 and the user input device 315 may be provided together as a touch-sensitive display unit.

In some implementations, the graphical display screen 313 includes a row data table (as discussed in further detail below), which includes a listing of row entries that each correspond to a different row unit of a planting machine, for seed planting quality performance of the planting machine using attributes of the sensor data associated with planting singulation and gauge wheel margin. The controller 301 is also configured to generate a tabular display using the attributes of the row data table. The controller 301 is also configured to generate a customizable window in which a user provides one or more user inputs defining, for example, performance thresholds, calculation window distances, etc. that are used by the controller 301 for generating the data displayed in the row data table and the tabular display. Additionally, the controller 301 is configured to controllably trigger transmission of the row data table to the graphical display screen 313 and/or modification of a user interface element of the graphical display screen 313 with the tabular display. Finally, the controller 301 is configured to controllably trigger alerts on the graphical display screen 313.

In some implementations, the controller 301 is configured to cause the seed sensor 307 and force sensor 309 to capture sensor data and calculate one or more seed placement metrics for seeds deposited in the trench by each row unit. Sensor data captured by the seed sensor 307 and force sensor 309 in this way may be stored to memory and/or used to generate row data tables. The stored sensor data can then be analyzed later in order to evaluate the manner and quality of seeding provided by the row crop planter 100 with respect to singulation and gauge wheel margin. Also, the controller can correlate the seed sensor 307 and force sensor 309 data with data of the distance module 311 and store the correlated data in the memory 305 according to a collection distance range. This information can, in turn, be used to evaluate and adjust settings of the row crop planter 100 and to evaluate the performance of the equipment of the row crop planter 100. Additionally, in some implementations, sensor data captured by the seed sensor 307 and force sensor 309 can be processed and/or displayed to the operator in real-time (or near-real-time, or "on-demand") to monitor and evaluate the planting process while planting is underway. This information may be used by the operator, for example, to make adjustments to improve the planting operation or to detect system failures before completing the planting process.

Figure 4:
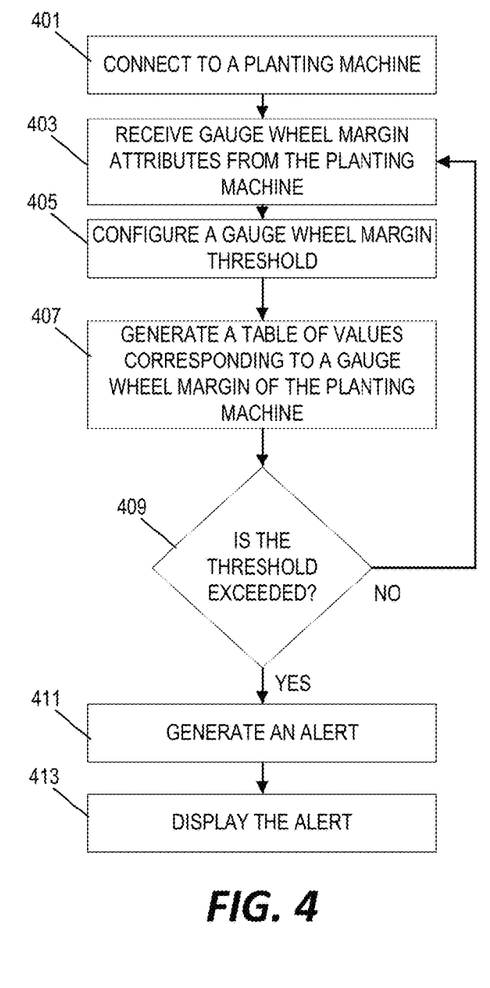
FIG. 4 is a flowchart of a method of managing planting quality of a seed placed by a seed planting machine using the system of FIG. 3.

FIG. 4 is an example of a method in which the controller 301 facilitates the planting quality management of a seed placed by the planting machine, according to implementations in the present disclosure. The controller 301 connects to the planting machine (step 401). The controller 301 receives gauge wheel margin attributes from the planting machine (step 403). In some implementations, the controller 301 receives force data of the force sensor 309 and information (e.g., applied downforce, depth settings, etc.) from the planting machine corresponding to a row unit of the planting machine. The controller 301 utilizes the processor 303 to calculate values (e.g., gauge wheel margin, ride quality, ground contact, etc.) associated with the depth the planting machine places a seed.

The controller 301 configures a gauge wheel margin threshold (step 405). A wheel gauge margin is an amount of weight carried by a row unit that is over and above the amount required for disc openers to penetrate to the full depth set. In some implementations, the controller 301 receives a range of values from a user device that correspond to a lowest (e.g., lower limit) and highest (e.g., upper limit) acceptable load (i.e., a range of suitable weights carried by a row unit to achieve full planting depth) of a row unit of the planting machine. The controller utilizes the processor 303 to generate a gauge wheel margin threshold for performance of the planting machine, which may indicate issues with components of the planting machine or planting environment.

The controller 301 generates a table of values corresponding to a gauge wheel margin of the planting machine (step 407). In some implementations, the controller 301 generates a table that includes a list of rows each corresponding to a different one of the row units of the planting machine. Additionally, the controller may receive a user selection from a user interface element of the table and modify the calculated values based on the user selection. The user selection may define or adjust a calculation window defining a distance travelled by the planting machine for which sensor data is used to calculate the metrics listed in the table. For example, the controller 301 may first calculate an average seed depth (or an average of one or more other metrics that are indicative of seed depth and/or that affect seed depth) for each row based on the force data captured by the force sensors 309 over the past 1000 feet travelled by the planting machine and will populate the displayed row data table based on these calculated average seed depth values. The user may then adjust the calculation window from 1000 feet to 2500 feet and, in response, the controller 301 will then calculate the average seed depth for each row based on the force data captured by the force sensors 309 over the past 2500 feet and will update the displayed row data table with the updated average seed depth values for the new calculation window. The controller 301 utilizes the force data and information of the planting machine that corresponds to the distance of the user selection from the memory 305 to generate/modify the table.

The controller 301 determines whether the gauge wheel margin threshold is exceeded (step 409). In some implementations, the controller 301 compares a load of a row unit of the planting machine to the gauge wheel margin threshold to determine whether the load of the row unit is suitable. If the controller 301 determines that the load of the row unit of the planting machine is greater than or equal to a lower limit of the gauge wheel margin threshold and less than or equal to an upper limit of the gauge wheel margin threshold (step 409, "NO" branch), then the controller 301 determines that performance (e.g., planting depth, trench depth, etc.) of the row unit of the planting machine is suitable and continues to monitor the row unit for performance issues. If the controller 301 determines that the load of the row unit of the planting machine is less than a lower limit of the gauge wheel margin threshold or greater than an upper limit of the gauge wheel margin threshold (step 409, "YES" branch), then the controller 301 determines that performance (e.g., planting depth, trench depth, etc.) of the row unit of the planting machine is not suitable and triggers an alert on a user device.

The controller 301 generates an alert (step 411). In some implementations, the controller 301 modifies a tabular display (e.g., graphical user interface element) of the graphical display screen 313. The controller 301 can modify the tabular display to include values corresponding to a row unit of the planting machine from the generated table (as discussed in step 407) and/or a color of a tab of the tabular display to indicate a performance issue with the row unit (e.g. in response to the generated alert signal). Additionally, in some implementations, the controller 301 is configured to automatically sort the line entries in the generated table to position a row corresponding to the row unit with an identified performance issue at the top of the generated table. For example, the controller 301 may be configured to calculate a total average gauge wheel margin (i.e., the average of the values calculated for each row unit) and then to display line items in order of deviation from the total average. Alternatively, the controller 301 may be configured to display the line items in order of lowest gauge wheel margin to greatest gauge wheel margin. In some implementations, the controller 301 is configured to display a row data table with multiple data attributes for each row unit and the graphical user interface allows the user to selectively sort the row data table by selecting an attribute by which to sort the line items. Additionally, in some implementations, the controller 301 is configured to trigger a message window that displays the modified table on the graphical display screen 313 in the event of the gauge wheel margin threshold is exceeded. The controller 301 outputs the alert (step 413). In some implementations, the controller 301 transmits the generated alert to a user device and/or an alert output device 314.

Figure 5:
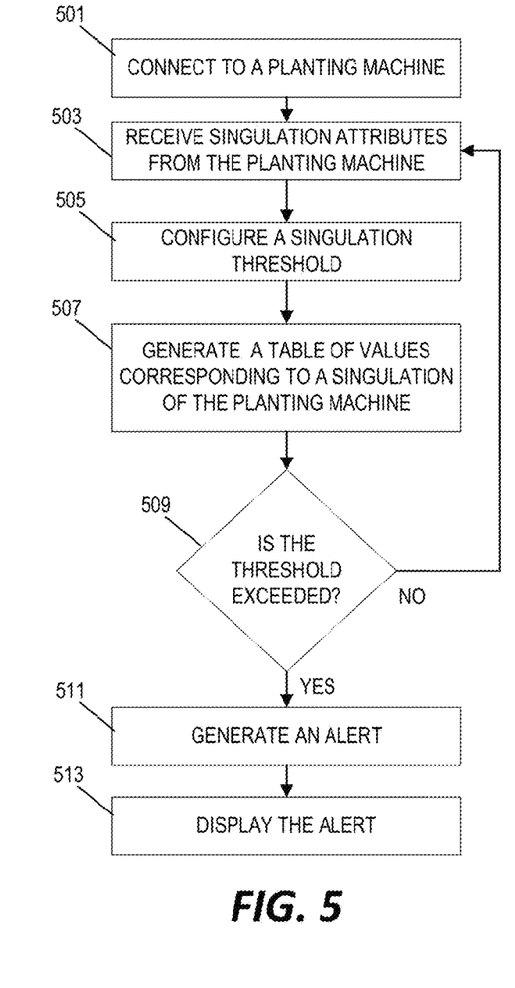
FIG. 5 is a flowchart of a method of managing planting quality of a seed placed by a seed planting machine using the system of FIG. 3.

FIG. 5 is an example of another method in which the controller 301 facilitates monitoring and management of seed placement—this time based on a calculated singulation percentage. The controller 301 connects to the planting machine (step 501). The controller 301 receives singulation attributes from the planting machine (step 503) or, in some implementations, calculates singulation attributes based on data received from the seed sensor 307. Based on the data stream of data from the seed sensor, the controller 301 for each intended seed location whether a single seed was dispensed, whether no seed was dispensed, or whether multiple seeds were dispensed. The controller 301 calculates a singulation percentage as a percentage of intended seed locations where only a single seed was dispensed. In some implementations, the controller 301 is configured to calculate other metrics in addition to or instead of singulation percentage including, for example, a "skip" percentage (i.e., the percentage of intended seed locations where no seed was dispensed), a "multiple" percentage (i.e., the percentage of intended seed locations where multiple seeds were dispensed), an "actual population" (i.e., a number of seeds actually dispensed per area of field surface or linear distance), and/or a seed spacing (i.e., indicative of an average distance between dispensed seeds). Again, the controller 301 is configured to calculate these singulation metrics for a defined "calculation window" and, as described in further detail below, this calculation window can be adjusted by a user input. When a user input is received that adjusts the calculation window, the controller 301 recalculates the singulation metrics for the newly defined calculation window.

The controller 301 configures a singulation threshold (step 505) (e.g., a user defined or pre-defined threshold singulation percentage). Singulation is the measurement of dropping one seed at a time. In some implementations, the controller 301 receives a target value from a user device that correspond to the lowest acceptable limit of singulation percentage of a row unit of the planting machine. The controller utilizes the processor 303 to generate a singulation threshold for performance of the planting machine, which may indicate issues with components of the planting machine or planting environment.

The controller 301 generates a table of values corresponding to the singulation metric(s) of the planting machine (step 507). In some implementations, the controller 301 generates a row data table that includes a line entry for each row unit of the planting machine and each line entry includes an identification of the corresponding row unit and the one or more calculated singulation metrics. Additionally, the controller may receive a user selection from a user interface element of the table and modify the calculated values based on the user selection (e.g., a user selection that adjusts the calculation window that is used to calculate the singulation metrics). The user selection may correspond to a distance travelled by the planting machine. The controller 301 utilizes the seed data and information of the planting machine that corresponds to the distance of the user selection from the memory 305 to generate/modify the table.

The controller 301 determines whether the singulation threshold is exceeded (step 509). In some implementations, the controller 301 compares the seed sensor data of a row unit of the planting machine to the singulation threshold to determine whether the singulation of the row unit is suitable. If the controller 301 determines that the singulation of the row unit of the planting machine is greater than or equal to the singulation threshold (step 409, "NO" branch), then the controller 301 determines that performance (e.g., seed placement, skips, multiples, etc.) of the row unit of the planting machine is suitable and continues to monitor the row unit for performance issues. If the controller 301 determines that the singulation of the row unit of the planting machine is less than the singulation threshold (step 409, "YES" branch), then the controller 301 determines that performance (e.g., seed placement, skips, multiples, etc.) of the row unit of the planting machine is not suitable and triggers an alert on a user device and/or another alert output device 314 (step 511).

In some implementations, the controller 301 modifies a tabular display (e.g., graphical user interface element) of the graphical display screen 313. The controller 301 can modify the tabular display to include values corresponding to a row unit of the planting machine from the generated table (as discussed in step 507) and/or a color of a tab of the tabular display to indicate a performance issue with the row unit (e.g., a visual indication that a row unit corresponding to a particular line entry of the row data table has a singulation percentage that is below the defined threshold). Additionally, in some implementations, the controller 301 may be configured to automatically sort the line entries in the row data table by singulation percentage (e.g., lowest singulation percentage to highest singulation percentage) so that line entries corresponding to the row unit with an identified performance issue are displayed at the top of the row data table. Additionally, in some implementations, the controller 301 is configured to trigger a message window that displays the modified table on the graphical display screen 313 in the event that at least one row unit has a singulation percentage that falls below the threshold. The controller 301 transmits the generated alert to a user device and/or to another alert output device 314 (step 513).

Figure 6A:
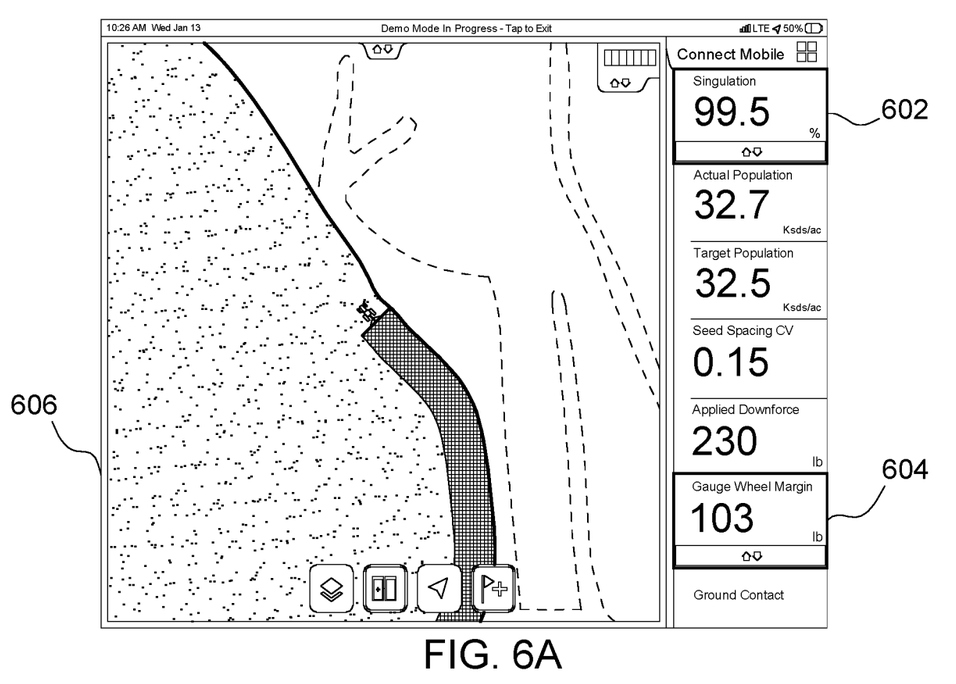
FIG. 6A is a representative view of a screen displaying a singulation and gauge wheel margin in an alerted state, according to embodiments in the present disclosure.

FIGS. 6A through 6E illustrate an example of a graphical user interface for the systems and methods described above. In FIG. 6A, the graphical user interface screen includes a series of tiles (or tabs) positioned along the right side of the display screen including, for example, a singulation tile 602 and a gauge wheel margin tile 604. Each tile displays a numeric representation of a calculated seed placement metric. As a data stream is received by the controller 301 by one or more sensors, the controller 301 calculates updated metrics and updates the values displayed in the tiles. In some implementations, a user is able to define and adjust user preference settings to control which metrics are displayed on this screen of the graphical user interface. The graphical user interface screen of FIG. 6A also includes an attribute map 606 that includes an overhead image of a field where the planting machine is operating and a color-coded indication of seed planting metrics for each row unit of the planting machine.

Figure 6B:
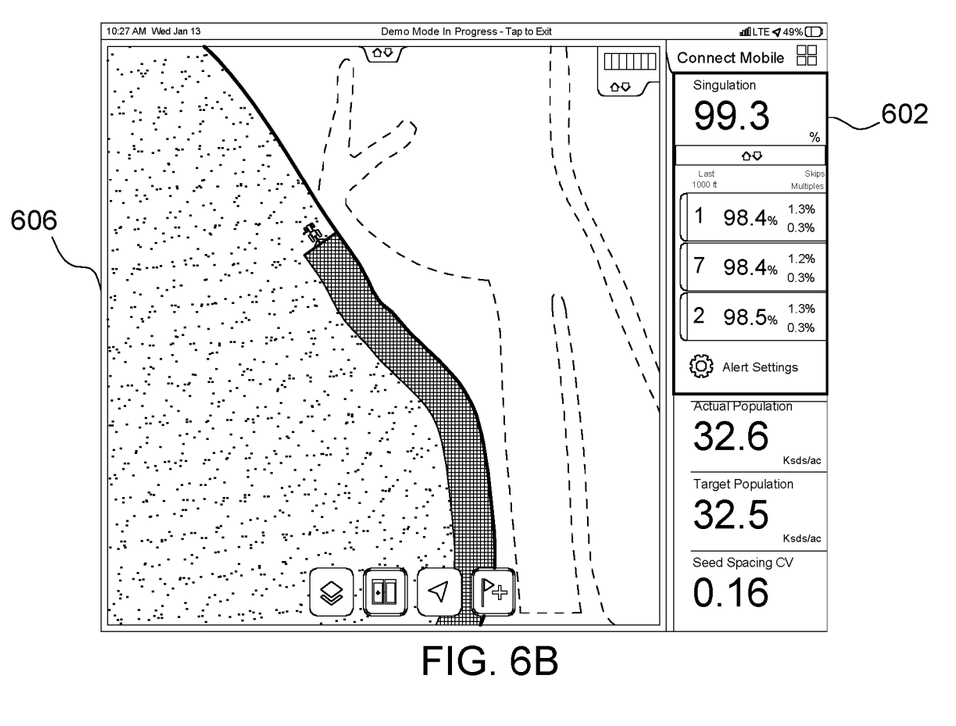
FIG. 6B is a representative view of a screen displaying singulation alert detail, according to embodiments in the present disclosure.

In this example, a user can change which metric is indicated on the attribute map 606 by selecting a tile in the tile list corresponding to another metric of interest. For example, in FIG. 6A, the attribute map 606 illustrates the "applied downforce" measured for each row unit of the planting machine at different locations that have been traveled by the planting machine. However, in response to a user selection of the "singulation" tile 602, the controller 301 changes the attribute map 606 to instead display a color-coded graphical representation of the singulation percentage metric for each row unit as shown in FIG. 6B. Similarly, in response to a user selection of the gauge wheel margin tile 604, the controller 301 changes the attribute map 606 to display a color-coded graphical representation of the gauge wheel margin metric for each row unit as shown in FIG. 6C.

Additionally, the graphical user interface is configured to display a visual indication of an error condition in response to receiving an error alert signal from the controller 301. In the example of FIG. 6A, the visual indication of the error condition is displayed as a red indicator bar in the tile for the corresponding metric. For example, in FIG. 6A, an indicator bar is displayed below the singulation tile 602 and below the gauge wheel margin tile 604. This indicates that the calculated singulation metric for at least one row unit is below the singulation percentage threshold and the gauge wheel margin metric for at least one row unit is outside of the acceptable gauge wheel margin range. These indicator bars are displayed no matter which attribute map is currently selected for display on the graphical display screen 313.

In some implementations, a user can click on the singulation tile 602 and the gauge wheel margin tile 604 to see more detail about the alerts. For example, in response to a user selection of the singulation tile 602, the singulation tile 602 is expanded (as shown in FIG. 6B) to display a list including line entries for each row unit with a singulation percentage that is below the defined threshold. Each line entry includes an identification of the corresponding row unit, the current singulation percentage metric, and additional metric information (e.g., the "skip" percentage and the "multiple" percentage for the row unit). As shown in the example of FIG. 6B, the line entries are displayed in the expanded tile in order of severity of the error state (i.e., the row unit with the lowest singulation percentage is displayed first). The expanded singulation tile 602 in FIG. 6B also includes a selectable icon for adjusting the "alert settings" corresponding to the singulation metric. For example, by selecting "alert settings" in the expanded singulation tile 602, the controller 301 will display a pop-up window that allows the user to turn singulation alerts on/off and to adjust the singulation percentage threshold and the calculation window used to calculate singulation percentage for each row unit.

Figure 6C:
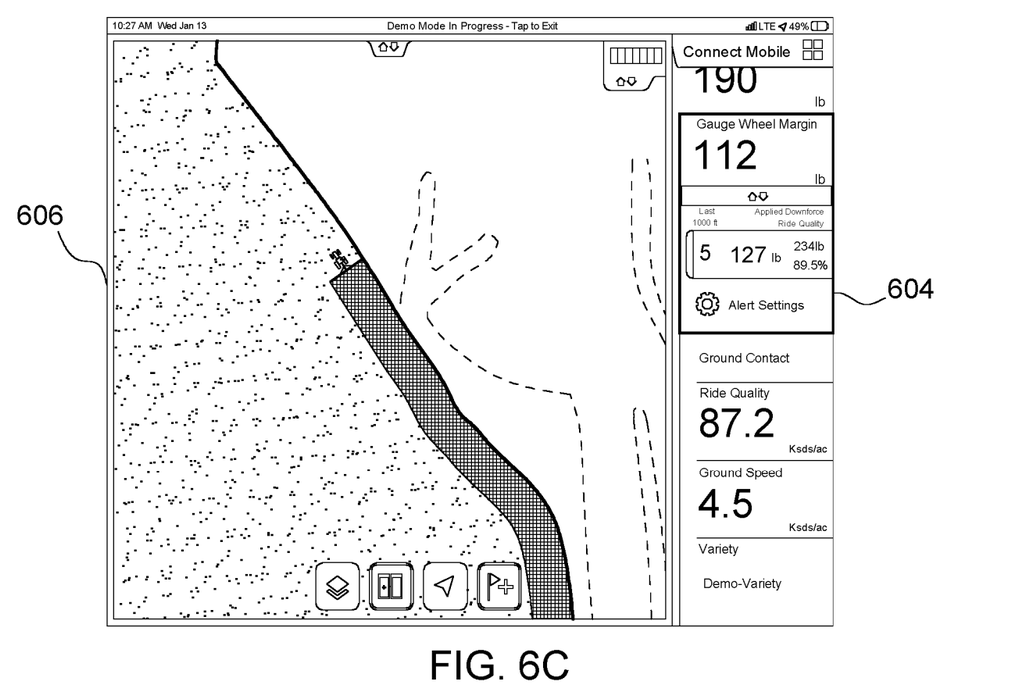
FIG. 6C is a representative view of a screen displaying gauge wheel margin alert detail, according to embodiments in the present disclosure.

Similarly, in response to a user selection of the gauge wheel margin tile 604, the gauge wheel margin tile 604 is expanded (as shown in FIG. 6C) to display a list including line entries for each row unit with a gauge wheel margin error condition. Each line entry includes an identification of the row unit corresponding to the line entry, the current gauge wheel margin metric for the row unit, and other related metrics (e.g., an applied downforce metric and a "ride quality" metric). In the example of FIG. 6C, only row unit "5" is in a gauge wheel margin error condition, but, if more than one row unit were included in the list of the expanded gauge wheel margin tile 604, the line entries would be sorted in order of relative severity of the error condition. The expanded gauge wheel margin tile 604 also includes a user-selectable icon for "alert settings" corresponding to the gauge wheel margin tile 604. In response to a selection of the "alert settings" icon, the controller 301 will display a pop-up window that allows the user to turn gauge wheel margin alerts on/off and to adjust the upper & lower bounds of the range of acceptable gauge wheel margin values and the calculation window used to calculate the gauge wheel margin metric for each row unit.

Figure 6D:
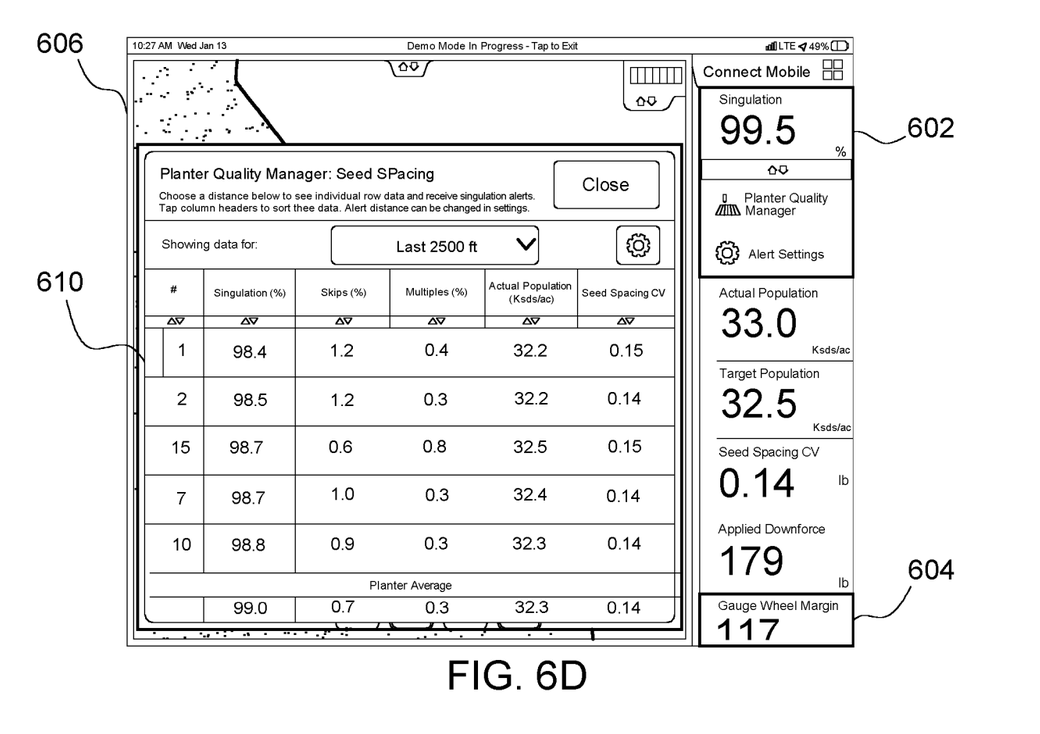
FIG. 6D is a representative view of a screen displaying singulation row data, according to embodiments in the present disclosure.
Figure 6E:
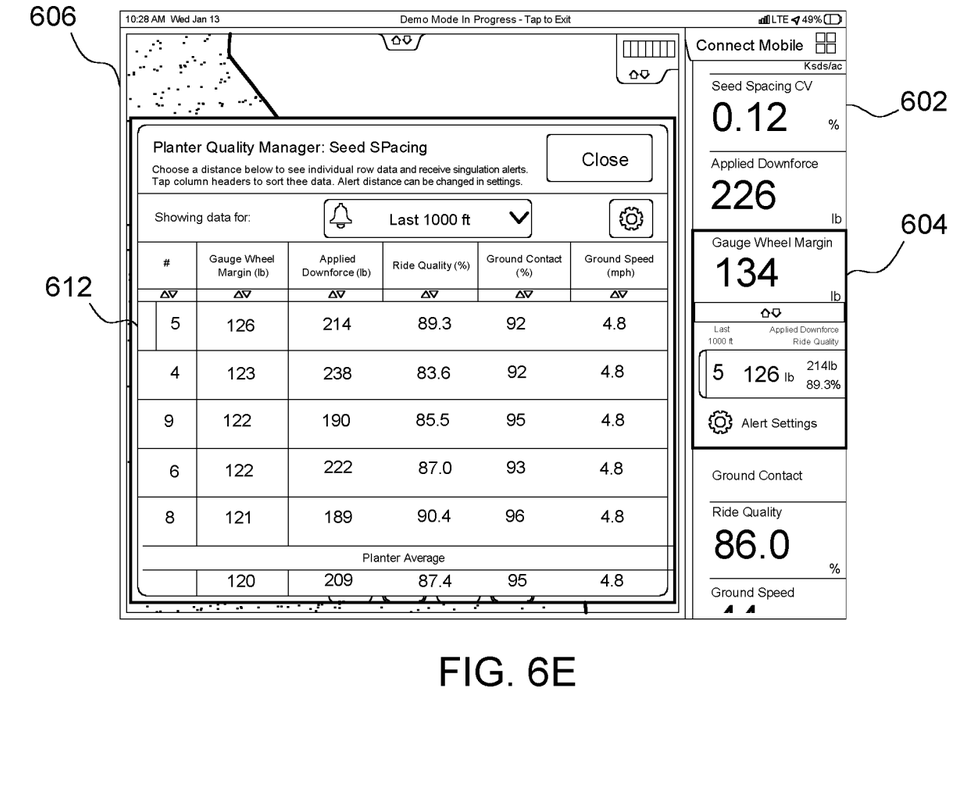
FIG. 6E is a representative view of a screen displaying margin row data, according to embodiments in the present disclosure.

Through the graphical user interface of FIGS. 6A through 6C, the user can also selectively access a row data table representation of different row unit metrics. For example, in some implementations, a "double-click" or "long-click" of the singulation tile 602 will cause the graphical user interface to display a pop-up window 610 with the seed spacing row data table as illustrated in FIG. 6D. Similarly, a "double-click" or "long-click" of the gauge wheel margin tile 604 will cause the graphical user interface to display a pop-up window 612 with the seed depth row data table as illustrated in FIG. 6E.

The row data table is a table including a plurality of line entries each corresponding to a different one of the plurality of row units of the planting machine. In some implementations, the row data table is scrollable so that a user can selectively view all of the line entries in the row data table and, in other implementations, the graphical user interface is configured to display only a defined number of line entries (and which line entries are displayed can be changed by user inputs sorting the line entries by different columns). In the example of FIG. 6D, each line entry in the singulation row data table includes an identification of the corresponding row unit (Column "#"), the calculated singulation percentage for that row unit (Column "Singulation (%)"), the calculated skip percentage for that row unit (Column "Skips (%)"), the calculated "multiples" percentage for that row unit (Column "Multiples (%)"), the calculated actual population for that row unit (Column "Actual Population (Ksds/ac)"), and the calculated seed spacing for that row unit (Column "Seed Spacing CV"). As shown in the example of FIG. 6D, the average value of each metric for all of the row units is calculated and displayed on the bottom of the singulation row data table under the heading "Planter Average").

Any metrics in the singulation row data table that fall beyond a defined threshold are displayed with a visual indication of the error condition. For example, in FIG. 6D, the singulation percentage for row unit "1" is calculated as 98.4%, which falls below the user-defined singulation percentage threshold. Accordingly, the cell in the data row table displaying the singulation percentage metric for row unit "1" is colored red. Additionally, a red indicator bar is displayed at the left side of the line entry for row unit "1" indicating that a singulation error condition has been detected for that row unit.

The graphical user interface of FIG. 6D is configured to allow the user to sort the row data table by metric by selecting the header of any column of the row data table. Additionally, the user can access and adjust the alert settings from this pop-up window by selecting the "gear" icon. Finally, the pop-up window also includes an interface element for the user to adjust the calculation window that is used to calculate the metric in the singulation row data table. In the example of FIG. 6D, a drop-down list interface element includes a plurality of different calculation window distances (e.g., options for calculation window distances may include "250 feet," "1000 feet," and "2500 feet"). In the example of FIG. 6D, the user has selected "Last 2500 feet" as the calculation window. Accordingly, the singulation percentage (and other metrics) displayed in the singulation row data table are calculated for seeds placed in the last 2500 feet traveled by the planting machine. In response to user inputs received through this drop-down list interface element, the controller 301 will automatically update the singulation row data table by calculating metrics for the newly defined calculation window, determining whether the updated metrics indicate any error conditions (e.g., a singulation percentage below the defined threshold), and updating the displayed row data table accordingly.

The user selectable distances (i.e., the calculation window) allows the user to compare trends that may be affected by changing soil conditions, changing wind/weather conditions, changing pass direction, etc. It also allows the user to determine in real-time how long an error condition has been present. For example, if the user has set the graphical user interface to calculate metrics and generate error alert signals based on only the last 100 feet traveled by the planting machine, the system will be able to generate alerts more quickly. However, the user might not notice an error condition as soon as it is detected by the system (e.g., if the user if viewing a different screen of the graphical user interface). By increasing the calculation window, the user can quickly determine whether the error condition is a recent deviation (e.g., if the error condition is detected in the data for a smaller calculation window, but is not detected in the data for the larger calculation window). Conversely, if an error condition is detected in the data for a larger calculation window, but is not detected in the data for a smaller calculation window, this may indicate that the cause of the error condition has been resolved (as it is no longer affecting the sensed data). Also, some error conditions may not be detectable in a smaller calculation window data set, but can be identified when using a larger calculation window data set. For example, if seed dispensing is regularly disrupted every 110 feet, this might not be detected in a calculation window of only 100 feet, but the pattern would be more prominent when using a larger calculation window (e.g., 1000 feet or 2500 feet).

The functionality of the graphical user interface pop-up window 612 for the seed depth row data table illustrated in FIG. 6E is similar to the pop-up window 610 for the singulation row data table as described above. The graphical user interface is configured to allow the user to sort the row data table by column (each column being indicative of a different, related metric). The row data table includes a visual indicator (i.e., a red color-coded cell in the row data table) identifying any row units with a gauge wheel margin metric that is outside of the defined acceptable range. And the user can provide a user input through a drop-down list interface element to cause the controller 301 to update the displayed row data table using different, user-selected calculation windows.

In some implementations, the controller 301 sends singulation alerts, gauge wheel margin alerts, singulation row data table 610, and seed margin row data table 612 to a cloud service. A remote manager views the information and communicates with the user about potential performance issues and remedies to address those issues on the planting machine.

Accordingly, the systems and methods described in this disclosure provide, among other things, a seed placement monitoring mechanism that concurrently tracks seed placement metrics for each of a plurality of row units in a planting machine while the planting machine is operating in a field, transmits an alert signal identifying error conditions in individual row units of the planting machine, and recalculates the alert metrics for different calculation windows based on a user input. Other features and advantages are set forth in the following claims.

What is claimed is:

1. A seed placement monitoring system, the system comprising:
an electronic controller configured to
receive a data stream from one or more sensors of a seed planting machine, wherein the data stream is indicative of seed placement in a field by each of a plurality of row units of the seed planting machine;
calculate, based at least in part on the data stream, an average seed placement metric for a defined calculation window for each of the plurality of row units;
display a user interface on a display screen, the user interface including a row data table with a plurality of line entries each corresponding to a different one of the plurality of row units, wherein each line entry includes an identification of a row unit corresponding to the line entry and the calculated average seed placement metric for the row unit;
compare the average seed placement metric for each of the plurality of row units to a performance threshold;
transmit an error alert signal based on the comparison;
receive, through the user interface, an adjusted calculation window; and
calculate updated average seed placement metrics for the adjusted calculation window; and
update the row data table and the error alert signal based on the updated calculation.

2. The system of claim 1, wherein the electronic controller is configured to calculate the average seed placement metric by calculating a seed singulation metric indicating a percentage of intended seed placements that includes an individual seed placed by the row seed planter.

3. The system of claim 2, wherein the electronic controller is configured to transmit the error alert signal by transmitting the error alert signal in response to determining that a seed singulation metric for at least one row unit of the plurality of row units is below a defined threshold percentage.

4. The system of claim 2, wherein the electronic controller is configured to display the user interface including the row data table by displaying the row data table with the plurality of line entries displayed in order from a lowest seed singulation metric to a highest seed singulation metric.

5. The system of claim 4, wherein the electronic controller is configured to transmit the error alert signal by causing a graphical user interface to display a visual indication in the row data table of one or more line entries of the plurality of line entries with a seed singulation metric value that is below the performance threshold.

6. The system of claim 5, wherein the electronic controller is configured to update the error alert signal based on the updated calculation by removing the visual indication in the row data table in response to determining that an updated seed singulation metric value for the row unit calculated for the adjusted calculation window is not below the performance threshold.

7. The system of claim 4, wherein the electronic controller is configured to update the row data table based on the updated calculation by updating the calculated seed singulation metric value for each line entry and re-sorting the line entries to display the plurality of line entries in order from a lowest updated seed singulation metric to a highest updated seed singulation metric.

8. The system of claim 1, wherein the electronic controller is configured to calculate the average seed placement metric by calculating a seed depth metric indicative of an average depth at which seeds come to rest in the field after being dispensed by the row unit.

9. The system of claim 8, wherein the electronic controller is configured to transmit the error alert signal by transmitting the error alert signal in response to determining that a seed depth metric for at least one row unit of the plurality of row units is outside of a defined range.

10. The system of claim 9, wherein the electronic controller is configured to automatically adjust an applied downforce of the row unit in response to the error alert signal.

11. The system of claim 1, wherein the defined calculation window includes a defined distance travelled by the seed planting machine prior to reaching a current location of the seed planting machine, and wherein the electronic controller is configured to calculate the average seed placement metric for the defined calculation window by calculating the average seed placement metric based on the data stream for seeds placed by the seed planting machine within the defined distance.

12. The system of claim 1, wherein the electronic controller is configured to display the user interface by displaying the user interface including an interface element configured to display a plurality of possible calculation window distances, and wherein the electronic controller is configured to receive the adjusted calculation window by receiving a user input selecting one of the plurality of possible calculation window distances from the interface element.

13. The system of claim 1, wherein the electronic controller is configured to transmit the error alert signal by transmitting the error alert signal to an output device configured to generate, in response to receiving the error alert signal, at least one selected from a group consisting of an auditory output, a visual output, and a haptic output.

14. The system of claim 1, wherein the electronic controller is configured to display the user interface on a portable computing device and to update the user interface based on subsequent data from the data stream as the seed planting machine continues to operate in the field.

15. A method for monitoring seed placement, the method comprising:
receiving a data stream from one or more sensors of a seed planting machine, wherein the data stream is indicative of seed placement in a field by each of a plurality of row units of the seed planting machine;

calculating, based at least in part on the data stream, an average seed placement metric for a defined calculation window for each of the plurality of row units;

displaying a user interface on a display screen, the user interface including a row data table with a plurality of line entries each corresponding to a different one of the plurality of row units, wherein each line entry includes an identification of a row unit corresponding to the line entry and the calculated average seed placement metric for the row unit;

comparing the average seed placement metric for each of the plurality of row units to a performance threshold;

transmitting an error alert signal based on the comparison;

receiving through the user interface, an adjusted calculation window; and calculating updated average seed placement metrics for the adjusted calculation window; and updating the row data table and the error alert signal based on the updated calculation.

16. The method of claim 15 wherein calculating the average seed placement metric includes calculating a seed singulation metric indicating a percentage of intended seed placements that includes an individual seed placed by the row unit.

17. The method of claim 16, wherein displaying the user interface including the row data table includes displaying the row data table with the plurality of line entries displayed in order from a lowest seed singulation metric to a highest seed singulation metric.

18. The method of claim 17, further comprising displaying a visual indication in the row data table of one or more line entries of the plurality of line entries with a seed singulation metric value that is below the performance threshold.

19. The method of claim 18, wherein updating the error alert signal based on the updated calculation includes removing the visual indication in the row data table in response to determining that an updated seed singulation metric value for the row unit calculated for the adjusted calculation window is not below the performance threshold.

20. The method of claim 15, wherein calculating the average seed placement metric includes calculating a seed depth metric indicative of an average depth at which seeds come to rest in the field after being dispensed by the row unit, and wherein transmitting the error alert signal includes transmitting the error alert signal in response to determining that a seed depth metric for at least one row unit of the plurality of row units is outside of a defined range.

* * * * *